United States Patent [19]
Fuhrmann et al.

[11] Patent Number: 5,074,390
[45] Date of Patent: Dec. 24, 1991

[54] CYLINDER PISTON DEVICE

[75] Inventors: Castor Fuhrmann, Brachtendorf; Alfred Klein, Weitersburg; Heinz-Josef Heinrichs, Koblenz-Metternich; Udo Wagner, Dachsenhausen, all of Fed. Rep. of Germany

[73] Assignee: Stabilus GmbH, Koblenz-Neuendorf, United Kingdom

[21] Appl. No.: 427,028

[22] Filed: Oct. 25, 1989

[30] Foreign Application Priority Data

Oct. 29, 1988 [DE] Fed. Rep. of Germany ....... 3836897

[51] Int. Cl.$^5$ .............................................. F16F 9/38
[52] U.S. Cl. .......................... 188/322.12; 267/64.11; 267/182
[58] Field of Search .................. 188/322.11, 322.19, 188/382; 267/64.11, 64.23, 64.24, 182

[56] References Cited

U.S. PATENT DOCUMENTS

| 1,496,757 | 7/1920 | Lewis et al. | 55/16 |
| 2,159,434 | 5/1939 | Frey | 55/16 |
| 3,850,141 | 11/1974 | Schmitt | |
| 4,194,041 | 3/1980 | Gore et al. | 428/315 |
| 4,591,137 | 5/1986 | Steinberg | 267/182 |
| 4,688,774 | 8/1987 | Warmuth, II | 267/64.24 |
| 4,783,202 | 11/1988 | Kraus et al. | 55/16 |

FOREIGN PATENT DOCUMENTS

| 0254350 | 5/1963 | Australia. | |
| 0198734 | 8/1988 | European Pat. Off. | |
| 1902019 | 8/1970 | Fed. Rep. of Germany. | |
| 0196343 | 11/1983 | Japan | 188/322.11 |

Primary Examiner—Robert J. Oberleitner
Assistant Examiner—Chris Schwartz
Attorney, Agent, or Firm—Brumbaugh, Graves, Donohue & Raymond

[57] ABSTRACT

According to an illustrative example of the invention, a gas spring comprises a cylinder and a piston rod. The piston rod is axially movable with respect to the cylinder and has a fastening eye mounted on the outer end of the piston rod. A tubular protection member surrounds an end portion of the cylinder adjacent to the end of the cylinder which is passed by the piston rod. The other end of the protection tube surrounds a holding disk fixed to the piston rod adjacent to the fastening eye. The protection tube and the piston rod define an air space therebetween. The air space is substantially tight against a liquid treating agent, such as a lacquer. On the other hand, the air space is in air flow connection with the surrounding atmosphere so that in response to axial movement of the piston rod with respect to the cylinder, excesssive pressure within the air space is prevented.

21 Claims, 1 Drawing Sheet

U.S. Patent    Dec. 24, 1991    5,074,390
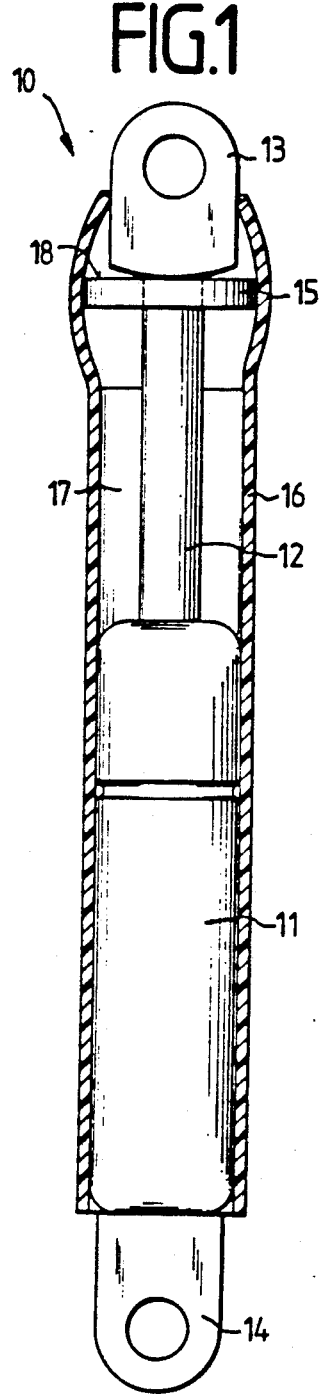
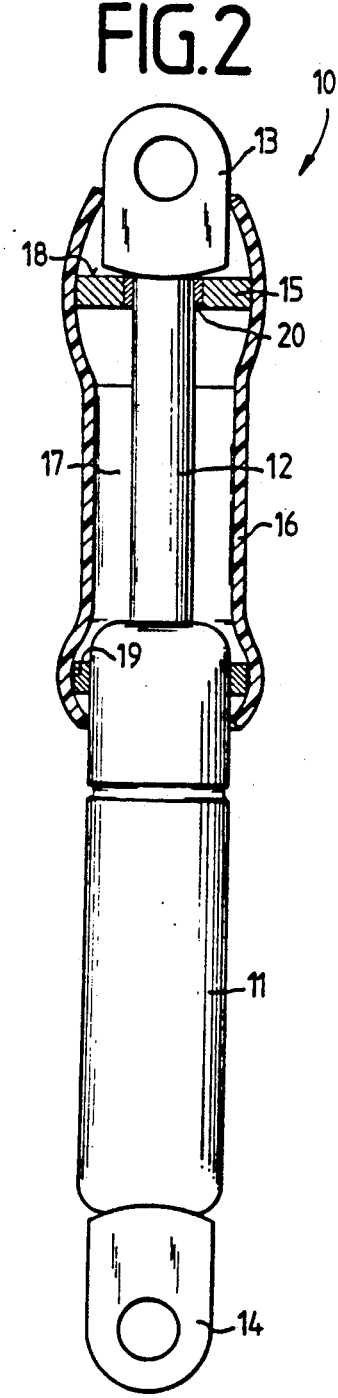
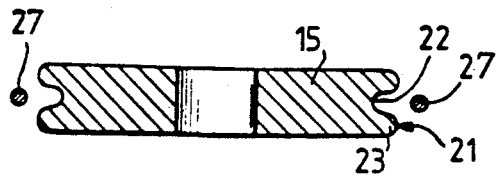
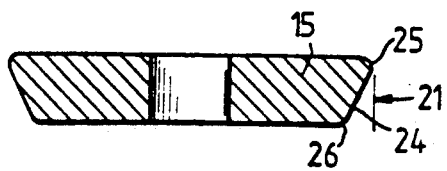

CYLINDER PISTON DEVICE

STATEMENT OF THE PRIOR ART

From German Patent 33 38 801 a cylinder piston device is known in which the external part of the piston rod extending beyond one end of the cylinder member is surrounded by a flexible tubular protection member which is fastened at one end thereof to the cylinder member and is fastened at the respective other end to a holding disk provided adjacent a fastening eye of the piston rod. The tubular protection member is made of a polymeric flexible material, which prevents access of a liquid to the piston rod both during the application of liquid paint or lacquer and during the drying or hardening treatment by heat.

The flexible protection tube is provided with a weakening line such that it can be removed from the cylinder piston device after the painting operation and the drying operation has been terminated.

OBJECT OF THE INVENTION

It has been found that during the painting operation, relative movement of the piston rod and the cylinder may occur with the result that the volume of the air space is increased and/or reduced and that such reduction and increase may occur periodically. Due to the reduction of the volume, the pressure within the air space may be increased. Such increased pressure may result in a separation of an end of the tubular protection member from the respective part of the cylinder piston device. Moreover, there is a risk that due to periodical movement of the piston rod with respect to the cylinder, a pumping effect occurs and that the pressure within the air space is more and more increased. This is particularly true, if an air connection of small cross-section exists between the air space and the surrounding atmosphere.

It is therefore an object of the present invention to provide a protection for the surface of the piston rod, particularly during painting and paint drying operations which avoids the risk of excessive pressure in the air space between the piston rod and the tubular protection member and which, as a result thereof, also avoids the risk of a separation of the tubular protection member from the respective part of a cylinder piston device

SUMMARY OF THE INVENTION

A cylinder piston device comprises a cylinder member having an axis and two ends and a piston rod member axially movable with respect to said cylinder member. The piston rod member has at least one external portion extending beyond one of the two ends of the cylinder member. The external portion of said piston rod member is surrounded by a flexible tubular protection member. This flexible tubular protection member is attached to the cylinder member and to the terminal portion of the piston rod adjacent an axially outer end thereof. An air space is defined between the external portion of the piston rod member and the tubular protection member. The air space is in air exchange connection with the atmosphere surrounding the tubular protection member. The air exchange connection has such a flow resistance for the air to be exchanged that in response to axial movement of the piston rod member with respect to the cylinder member, no substantial increase in pressure within the air space occurs, which could result in a separation of the tubular protection member from the respective mechanical part. This is particularly true in case of a periodical inward and outward movement of the piston rod with respect to the cylinder member which might result in a pumping effect. On the other hand, air exchange connection must be such that the access of liquid treating agent, such as paint, to the surface of the piston rod member is prevented.

As a matter of practice, the air flow resistance of the air exchange connection should be such that, at an oscillation frequence of the piston rod member with respect to the cylinder member of one cycle per second and a stroke corresponding to the maximum length of the external portion, no pumping effect occurs which could result in a pressure sufficient to either destroy the protection tube or sufficient to destroy the connection of the protection tube with the cylinder member or the piston rod member.

The present invention is e.g. applicable to gas springs and positioning devices which are used in connection with hoods, doors and rear doors of motor vehicles. It may be used, however, also for shock absorbers and spring legs in motor vehicles.

The tubular protection member may be manufactured of plastic material which is resistant to the respective paint or lacquer and resistant to the drying temperatures of the respective paint or lacquer. The plastic material may be heat-shrinkable such that it can be fixed by shrinking with respect to the cylinder member and/or the outer end of the piston rod member.

The tubular protection member may surround the cylinder member along at least a part of the axial length thereof. Such the surface of the cylinder member may be protected from paint or lacquer. This is particularly valuable in cases in which the surface of the cylinder member is provided with written informations.

The tubular protection member may surround a holding member provided member provided adjacent the axially outer end of said external portion of the piston rod member. This holding member may have a larger cross-sectional area than the piston rod member such that fixation of the tubular protection member is facilitated.

The tubular protection member may be fixed on the holding member by securing means located radially outwards of said tubular protection member. These securing means may replace the above-mentioned shrinking fixation or may be used in addition to such shrinking fixation.

The securing means may comprise a securing ring member which is preferably at least partially received by an annular securing groove of the holding member.

The holding member may be part of a fastening member provided for connecting said piston rod member with an allocated construction member. Alternatively, the holding member may be a holding disk member adjacent a fastening, member provided for connecting the piston rod member with an allocated construction part.

In order to prevent the adhering of treating liquid to the holding member, the holding member may be electrically insulated from the piston rod member, particularly in view of cataphoresis treatment, e.g. the holding member may be made of electrically insulating material.

At its other end, the tubular protection member may surround a spacer ring member provided on the cylinder member. In this case, the tubular protection member may be fixed with respect to said spacer ring member by securing means located radially outwards of the tubular protection member, e.g. the securing means may comprise a securing ring member engaging an annular groove of the annular spacer member. This fixation may replace the abovementioned shrinking or may be used additionally besides such shrinking.

The holding member may be provided with air passage means, the air passage means being such as to prevent substantial access of liquid treating agents towards said air space, e.g. the holding member may be at least partially made of a porous material permeable for air and gas but substantially impermeable for a liquid treating agent. The porous material may be sintered material on the basis of metallic or preferably plastic or ceramic powder.

Also, the spacer ring member may be provided with air passage means such as to prevent substantial access of liquid treating agent towards the air space, e.g. the spacer ring member may be at least partially made of a porous material permeable for air and gas but substantially impermeable for a liquid treating agent. This porous material may be again a sintered material as defined above.

Also, the tubular protection member may be provided with air passage means, e.g. the tubular protection member may be at least partially made of a material permeable for air and gas but substantially impermeable for a liquid treating agent. Such porous but liquid impermeable materials are available in commerce, e.g. under the trade name Gore-Tex, which is a material on the basis of fluorinated hydrocarbon polymers which have been submitted to special elongation treatment.

For facilitating the mounting of the tubular protection member, at least one of the holding member and the spacer ring member may be tapered such as to facilitate mounting of the protection tube onto the holding member and the spacer ring member, respectively.

The invention further comprises a method of surface treatment of a construction, which comprises a cylinder piston device attached thereto. Again, the cylinder piston device comprises a cylinder member and a piston rod member axially movable with respect to the cylinder member. The piston rod member has at least one external portion extending beyond one of the two ends of the cylinder member. The surface treatment comprises applying a treating liquid, such as a lacquer, onto at least part of the surface of the construction. In this method, the external portion of the piston rod member is surrounded by a tubular protection member, and an air space is defined between the external portion of the piston rod member and the tubular protection member. The air space is substantially tightened against entrance of treating liquid into the air space. On the other hand, the air space is in air exchange connection with the atmosphere surrounding the tubular protection member. The flow resistance may be again selected such as defined above.

Also in this method, the tubular protection member may surround the cylinder member over at least part of the axial length thereof.

The various features of the invention are discussed especially in the accompanying claims which form a part of the disclosure.

For the best understanding of the invention, its working advantages and specific effects, reference is now made to the accompanying drawings and the description in which preferred embodiments of the invention are discussed.

BRIEF DESCRIPTION OF THE DRAWINGS

The invention will be described in greater detail below by reference to the forms of embodiment as represented in the drawings, wherein:

FIG. 1 shows a pneumatic spring with driven-out piston rod with fixing eyelet, holding disk allocated to the fixing eyelet and a protective cover pulled over the holding disk and the cylinder;

FIG. 2 shows a pneumatic spring according to FIG. 1 with an annular spacer ring allocated to the cylinder for receiving the protective covering and an electric insulator for insulating the holding disk from the piston rod;

FIG. 3 shows a detail of the holding disk with a holding groove;

FIG. 4 shows a detail of the holding disk with a tapered configuration.

The pneumatic spring 10 shown in FIGS. 1 and 2 consists essentially of a cylinder 11 into and from which a piston rod 12 can be moved. At the free end, projecting from the cylinder 11, the piston rod 12 is provided with a piston rod-end fixing eyelet 13, while the cylinder 11 is provided, at its free end remote from the piston rod 12, with a cylinder-end fixing eyelet 14.

A holding disk 15 is arranged on the piston rod 12 in the immediate vicinity of the piston rod-end fixing eyelet 13. A protective tubular cover 16 composed of an extruded, high temperature resistant elastomer is pulled over the holding disk 15 and the cylinder 11 such as to elastically engage the holding disk 15 and the cylinder 11.

The holding disk 15 is composed of a porous, air- and gas-permeable material to allow ventilation of the interior space 17 of the protective cover 16 in which the piston rod 12 travels. The holding disk 15 does not conduct electricity or conducts electricity poorly to avoid being moistened with electrically charged particles of paint during immersion painting in a cataphoresis bath.

In the design shown in FIG. 2, the cylinder 11 is provided with an annular spacer member 19 with which the protective cover 16 is kept clear of the cylinder 11. This annular spacer member 19 assists disassembly of the protective cover 16 when it is to be removed from the pneumatic spring 10 after immersion painting.

The holding disk 15 is here provided with an electric insulator 20 by which it is insulated from the electrically conductive piston rod 12. This electric insulator 20 prevents electrically charged particles of paint from adhering to the external surface 18 of the holding disk 15 during immersion painting. As the holding disk 15, the annular spacer member 19 can also be permeable to gas and air and can be produced from a material which does not conduct electricity.

FIGS. 3 and 4 show two preferred embodiments of the holding disk 15. In the embodiment shown in FIG. 3, an annular groove 22 is limited on both sides by peripheral beads 23 provided on the outer periphery 21 of the holding disk 15. In the assembled state, the protective cover 16 is held on these peripheral beads 23 and can be fixed in its position by an annular fixing element 27, e.g. a resilient ring, an O-ring or the like.

In the embodiment shown in FIG. 4, the outer periphery 21 is provided with a bevel 24, the large diameter 25 being adjacent the piston rod-end fixing eyelet 13 and the small diameter 26 being adjacent the cylinder 11. The protective cover 16 is expanded as it is pulled over the cylinder 11 and the holding disk 15 or the annular spacer member 19, producing relatively high, radially inwardly directed inherent stress. This inherent stress should be substantially equal all round and should enable the protective cover 15 to make good contact.

The orientation of the bevel 24, of course, is dependent on the direction according to which the cover is mounted onto the pneumatic spring. Of course, also the annular spacer member 19 can be bevelled or provided with an annular groove.

In order to obtain a low flow resistance between the space 17 and the atmosphere, both the holding disk 15 and the annular spacer member 19 may be of porous material. Moreover, the protection cover 16 may be made of a porous material, like Gore-Tex ®. The cover may be manufactured as a circularly closed tube. It is, however, also possible to manufacture the cover 16 from a planar web of material by rolling the planar web of material and connecting the edges thereof. In this case, the gas passage may be provided along the connection of the respective edges, while again providing tightness against liquid.

Specific forms of embodiment of the invention have been represented and described in order to illustrate the use of the principles of the invention. Of course, the invention can also be realized in other ways without departing from these principles.

The reference numbers in the claims serve only for facilitation of understanding and are not to be understood as a limitation.

I claim:

1. A cylinder piston device comprising a cylinder member (11) having an axis and two ends and a piston rod member (12) axially movable with respect to said cylinder member (11), said piston rod member (12) having at least one external portion extending beyond one of said two ends of said cylinder member (11), said external portion of said piston rod member (12) being surrounded by a flexible tubular protection member (16), said flexible tubular protection member (16) being attached to said cylinder member (11) and to said external portion adjacent an axially outer end thereof, an air space (17) being defined between said external portion of said piston rod member (12) and said tubular protection member (16), and means for maintaining said air space (17) in air exchange connection with the atmosphere surrounding said tubular protection member (16) so as to prevent an increase in air pressure within said air space (17) sufficient to separate the protection member (16) from attachment to said cylinder piston device and so as to substantially prevent the entrance of liquid into the air space (17).

2. A cylinder piston device as set forth in claim 1, said tubular protection member (16) surrounding said cylinder member (11) along at least a part of the axial length thereof.

3. A cylinder piston device as set forth in claim 1, said tubular protection member (16) surrounding a holding member (15) provided adjacent the axially outer end of said external portion of said piston rod member (12).

4. A cylinder piston device as set forth in claim 3, said tubular protection member (16) being fixed on said holding member (15) by securing means (27) located radially outwards of said tubular protection member (16).

5. A cylinder piston device as set forth in claim 4, said securing means comprising a securing ring member (27).

6. A cylinder piston device as set forth in claim 5, said securing ring member (27) being at least partially received by an annular securing groove (22) of said holding member (15).

7. A cylinder piston device as set forth in claim 3, said holding member being part of a fastening member (13) provided for connecting said piston rod member (12) with an allocated construction member.

8. A cylinder piston device as set forth in claim 3, said holding member (15) being a holding disk member (15) adjacent a fastening member (13) provided for connecting said piston rod member (12) with an allocated construction part.

9. A cylinder piston device as set forth in claim 3, said holding member (15) being electrically insulated from said piston rod member (12).

10. A cylinder piston device as set forth in claim 3, said holding member (15) being made of electrically insulating material.

11. A cylinder piston device as set forth in claim 1, said tubular protection member (16) surrounding an annular spacer member (19) provided on said cylinder member (11).

12. A cylinder piston device as set forth in claim 11, said tubular protection member (16) being fixed with respect to said annular spacer member (19) by securing means located radially outwards of said tubular protection member (16).

13. A cylinder piston device as set forth in claim 12, said securing means comprising a securing ring member engaging said annular spacer member, preferably by engagement into an annular groove of said annular spacer member.

14. A cylinder piston device as set forth in claim 3, said means for maintaining said air connection comprising air passage means in said holding member (15), said air passage means being such as to prevent substantial access of liquid treating agent towards said air space (17).

15. A cylinder piston device as set forth in claim 11, said means for maintaining said air connection comprising air passage means in said annular spacer member such as to prevent substantial access of liquid treating agent towards said air space (17).

16. A cylinder piston device as set forth in claim 15, said annular spacer member (19) being at least partially made of a porous material permeable for air and gas but substantially impermeable for a liquid treating agent.

17. A cylinder piston device as set forth in claim 1, said means for maintaining said air connection comprising air passage means in said tubular protection member (16).

18. A cylinder piston device as set forth in claim 17, said tubular protection member (16) being at least partially made of a material permeable for air and gas but substantially impermeable for a liquid treating agent.

19. A cylinder piston device as set forth in claim 1 or 11, at least one of said holding member (15) and said annular spacer member (19) being tapered such as to facilitate mounting of said protection tube onto said holding member (15) and said annular spacer member (19), respectively.

20. A cylinder piston device as set forth in claim 1, said cylinder piston device being a gas spring, said cylinder member (11) defining a cavity therein, said cavity containing a body of pressurized gas.

21. A cylinder piston device comprising:
a cylinder member (11) having an axis and two ends and a piston rod member (12) axially movable with respect to said cylinder member (11), said piton rod member (12) having at least one external portion extending beyond one of said two ends of said cylinder member (11), said external portion of said piton rod member (12) being surrounded by a flexible tubular protection member (16), said flexible tubular protection member (16) being attached to said cylinder member (11) and to said external portion adjacent an axially outer end thereof and surrounding a holding member (15) provided adjacent the axially outer end of said external portion of said piston rod member (12);
an air space (17) being defined between said external portion of said piston rod member (12) and said tubular protection member (16); and
said holding member (15) being at least partially comprised of a porous material permeable to air and gas but substantially impermeable to a liquid treating agent, so as to prevent an increase in air pressure within said air space (17) sufficient to separate the protection member (16) from attachment to said cylinder piston device and so as to substantially prevent the entrance of liquid into the air space (17).

* * * * *

UNITED STATES PATENT AND TRADEMARK OFFICE
CERTIFICATE OF CORRECTION

PATENT NO. : 5,074,390

DATED : December 24, 1991

INVENTOR(S) : Castor Fuhrmann, et al

It is certified that error appears in the above-identified patent and that said Letters Patent is hereby corrected as shown below:

Col. 1, line 3, insert the following:

BACKGROUND OF THE INVENTION

Cylinder piston devices such as gas springs are frequently used as parts of motor vehicle constructions. It is frequently desired to submit such motor vehicle constructions to a painting treatment with a liquid paint or lacquer after the construction or a respective part of the construction has been assembled with the cylinder piston device. When submitting such a construction to a painting treatment, care must be taken that the highly polished surface of the piston rod remains free of paint or lacquer. The painting treatment is e.g. performed by immersion into a vessel containing the respective paint or lacquer or by the so-called cataphoresis treatment. The paint or lacquer must be dried after applying, and also during such drying under relatively high temperatures, such as about $180 - 200^\circ C$, further care must be taken that the

UNITED STATES PATENT AND TRADEMARK OFFICE
CERTIFICATE OF CORRECTION

PATENT NO. : 5,074,390

DATED : December 24, 1991

INVENTOR(S) : Castor Fuhrmann, et al

It is certified that error appears in the above-identified patent and that said Letters Patent is hereby corrected as shown below.

Page 2 of 2 surface of the piston rod remains free of paint and lacquer to be dried.

Col. 2, line 39, delete "member provided: (second occurrence);

Col. 5, line 24, "I claim:" should read --We claim:--;

Col. 7, line 6, "piton" should read --piston--.

Signed and Sealed this

Twenty-seventh Day of April, 1993

Attest:

MICHAEL K. KIRK

Attesting Officer

Acting Commissioner of Patents and Trademarks